United States Patent [19]
Steiger

[11] 3,877,538
[45] Apr. 15, 1975

[54] POWER ASSIST DEVICE FOR HYDROSTATIC DRIVE

[76] Inventor: Douglas W. Steiger, P.O. Box 5, St. Hilaire, Minn. 56701

[22] Filed: Jan. 28, 1974

[21] Appl. No.: 437,367

[52] U.S. Cl. .................. 180/6.48; 60/465; 60/484; 60/486; 74/471 R
[51] Int. Cl. ............................................ B62d 11/04
[58] Field of Search ............ 60/393, 433, 465, 471, 60/476, 486, 487; 74/471 XY, 471 R; 180/6.48, 44 F, 66 R

[56] References Cited
UNITED STATES PATENTS

| | | | |
|---|---|---|---|
| 2,941,609 | 6/1960 | Bowers et al. | 180/6.48 |
| 3,323,607 | 6/1967 | Futamata | 180/6.48 |
| 3,611,827 | 10/1971 | Bottum et al. | 74/471 R |

*Primary Examiner*—Edgar W. Geoghegan
*Attorney, Agent, or Firm*—Williamson, Bains & Moore

[57] ABSTRACT

A hydrostatic drive system is provided with a power assisting device in the form of a pair of hydraulic rams assist in manual manipulation of the control lever for the hydrostatic system.

The hydrostatic drive system comprises a reversible hydrostatic pump which is connected in fluid communicating relation by a pair of passages to a reversible hydrostatic motor. The motor provides drive to driven members such as the ground engaging wheels of a front-end loader. The pump is controlled by a manually shiftable elongate control lever which is connected by linkage to an actuating member for the hydrostatic pump. The single acting hydraulic rams are connected to the actuating member for the pump and are arranged in opposed relation with respect to each other, and each ram is connected in communicating relation to one of said passages which interconnects the pump and motor. Each hydraulic ram will be extended when hydraulic fluid is pumped through the associated pressure passage to operate the hydraulic motor in one direction. Therefore, when a user shifts the manually operable control lever, one of the hydraulic rams will assist movement of the actuating member and facilitate movement of the manually operable control lever.

3 Claims, 3 Drawing Figures

PATENTED APR 15 1975   3,877,538

POWER ASSIST DEVICE FOR HYDROSTATIC DRIVE

SUMMARY OF THE INVENTION

This invention relates to a hydrostatic drive apparatus and more specifically to a power assist device in a hydrostatic system for assisting movement of the control lever for the hydrostatic system.

One of the problems experienced with hydrostatic drive systems and specifically those systems which employ a manually shiftable control lever is the resistance or torque exerted on the control lever when the hydrostatic system is subjected to heavy loads. For example, when a hydrostatic drive is employed to operate the ground engaging wheels of the front-end loader vehicle, such as that disclosed in my copending application, Ser. No. 78,874, filed Sept. 13, 1970, now abandoned the direction of travel and steering is accomplished through the manipulation of a control lever. In some instances, the operator finds it difficult to shift the control lever especially when the front-end loader is continuously subjected to heavy loads. The torque required to shift the control lever is directly proportional to the pump pressure and also to the pump speed. It has therefore been necessary to provide power assist devices to facilitate shifting of the control lever and certain servo systems have been provided to function as a power assist for the control lever. However, these servo systems are not only expensive, but are complicated and quite bulky in construction.

It is therefore a general object of this invention to provide a hydraulic power assist device, of simple and inexpensive construction, for facilitating and assisting movement of the control lever of a hydrostatic drive system.

More specifically, it is a general object of this invention to provide a pair of slave rams, each being connected to one of the respective pressure lines from the hydrostatic pump to the motor, and each slave ram being connected to the pump actuator. Each slave ram will be extended in response to an increase in pressure in the associated pressure line from the pump, and will act directly to shift the actuating member and therefore assist movement of the latter by the control lever. With this arrangement, the resistance or torque needed to operate the hydrostatic system may be selectively varied in accordance with the level of resistance which a user desires to experience during manipulation of the control lever.

These and other objects and advantages of this invention will more fully appear from the following description made in connection with the accompanying drawings wherein like references refer to the same or similar parts throughout the several views.

FIGURES OF THE DRAWINGS

DESCRIPTION OF THE PREFERRED EMBODIMENT OF THE INVENTION

Figure 1:
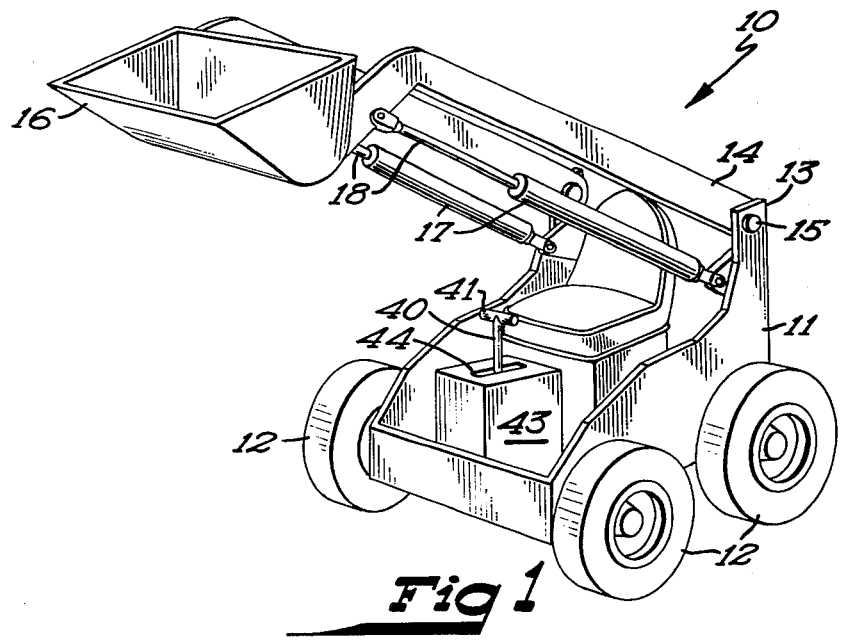
FIG. 1 is a front perspective view of a small skid steer type front-end loader utilizing a hydrostatic drive system having my novel power assist device.

Referring now to FIG. 1, it will be seen that one embodiment of my novel power assist device for a hydrostatic drive system is incorporated in a skid steer-type front-end loader vehicle, designated generally by the reference numeral 10. The front-end loader 10 includes a body 11 comprised of side plates and having a front and rear pair of ground engaging wheels 12 on each side thereof. The side plates also include upwardly projecting arm support portions 13 at the rear thereof, and these arm support portions pivotally support a pair of arms 14 by means of a pivot 15. It will be noted that the arms 14 project forwardly of the vehicle and have a scoop 16 pivotally mounted on the front end thereof. The arms 14 are swung vertically about their horizontal axis by means of double-acting hydraulic cylinders 17 which are pivotally mounted on the arm support portions 13 by suitable brackets. Each double-acting hydraulic cylinder 17 has a piston and a piston rod 18 therein, the latter being pivotally connected to the outer ends of the arms 14.

Figure 2:
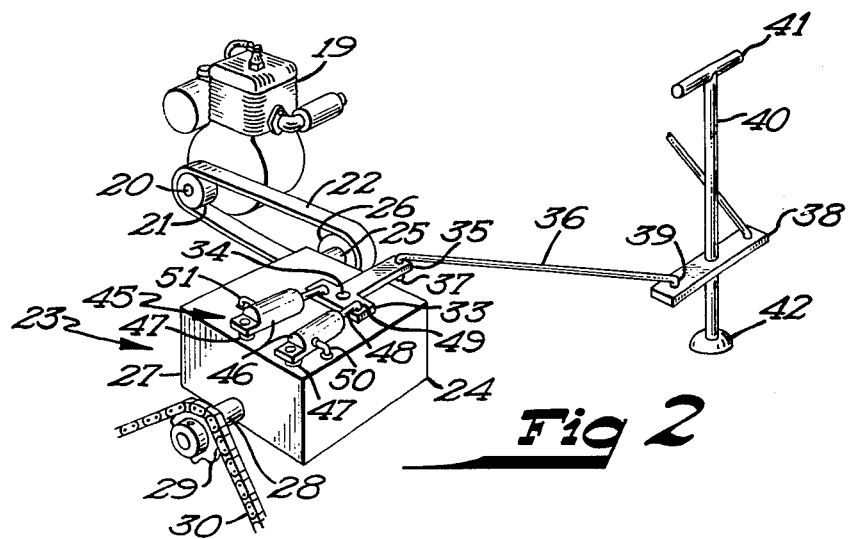
FIG. 2 is a diagrammatic perspective view of the components of the hydrostatic drive system, including the power assist device.

The means for operating the front-end loader 10 and including steering and direction of travel comprises an engine 19, diagrammatically shown in FIG. 2 and which has an output shaft 20 having a pully 21 affixed thereto for rotation therewith. An endless belt 22 is trained about the output shaft 20 and the endless belt is also drivingly connected to a reversible hydrostatic unit 23.

When a hydrostatic drive unit is used as a drive means for a front-end loader, two such hydrostatic drive units are provided, each driving the drive-engaging wheels on one side of the vehicle. Each hydrostatic drive unit includes a hydrostatic pump 24 having a revolvable input shaft 25 which has a pulley 26 keyed thereto for rotation therewith. The endless belt 22 is trained about the pulley 26 and it will be seen that when the engine 19 is operated, pump 24 for each hydrostatic unit 23 will also be operated. Each hydrostatic unit 23 also includes a hydrostatic motor 27 having a revolvable output shaft 28 which is drivingly connected by suitable drive means to the ground engaging wheels on one side of the vehicle. In the embodiment shown, the output shaft 28 for each motor is provided with a sprocket 29 keyed thereto about which is trained an endless chain 30 which is also trained about sprockets (not shown) on the wheel axles. It is pointed out that the drive connections from the hydrostatic motor 27 to the ground engaging wheels may include the gear train or equivalent structure, rather than a chain and sprocket.

Figure 3:
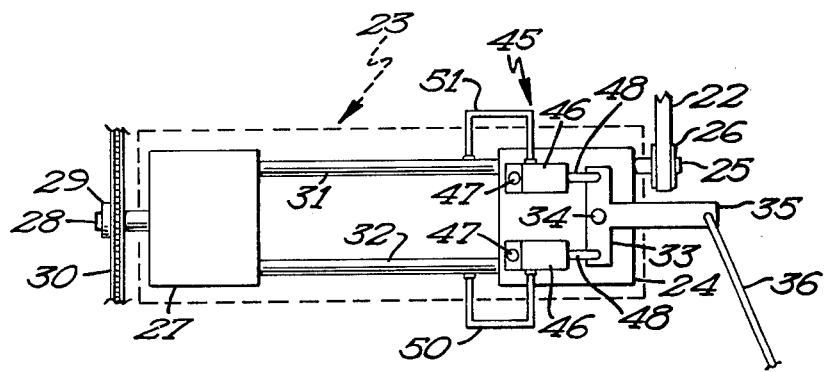
FIG. 3 is a diagram of the components of the hydrostatic system, including the power assist device.

Referring now to FIG. 3, it will be seen that the pump 24 is connected to the hydrostatic motor 27 by means of a conduit 31 and conduit 32. When fluid is pumped through the conduit 31 to the motor 27, the output shaft of the motor will be revolved in a forward direction and it will be returned to the pump through conduit 32. However, when fluid is pumped through the conduit 32 from the pump 24 to the motor 27, the output shaft of the motor 27 will be driven in a reverse direction. The hydrostatic unit also has a neutral position in which the output shaft of the motor will be rendered inoperative. Although the hydrostatic unit has been illustrated diagrammatically in FIG. 3, it will be appreciated that when the hydrostatic (pump motor) units are comprised of a single housing, the conduits 31 and 32 will actually constitute passages in the housing or casting.

The means for operating the pump 24, comprises an actuating member 33 which is pivotally mounted on the pump 24 by means of a pivot 34. The actuating member 33 also has an arm 35 integral therewith and the arm is pivotally connected to the one end of an elongate motion transmitting link 36. In this respect, the arm 35 has an opening therein through which the downturned end 37 of the arm 35 projects. The other end of the motion transmitting link 36 is pivotally connected to a transverse arm 38 which is affixed to an elongate generally vertical control lever member 40.

In the embodiment shown, the arm 38 has an opening in one end thereof through which the downturned end 39 of the link 36 projects. It is pointed out that each hydrostatic unit 23 operates a pair of ground engaging wheels, (or one side of the vehicle) and two such units will be provided and are controlled by the control lever 40. The control lever 40 is provided with a transverse hand grip portion 41 at its upper end to facilitate manipulation of the lever. The lower end portion of the lever 40 is mounted on the body 11 of the front-end loader by means of a universal coupling 42. Thus, the control lever 40 is mounted on the body to permit fore and aft swinging movement of the control lever about a substantially transverse horizontal axis, and also permitting rotation of the control lever about its longitudinal axis. The control lever is actually positioned within a generally rectangular-shaped housing 43 which has a slot 44 in the upper wall thereof. The details of construction of the hydrostatic drive unit when used in a front-end loader vehicle are clearly disclosed in my copending application, Ser. No. 78,874, now abandoned and the details of construction as set forth therein are incorporated by reference with respect to the instant application.

It will be appreciated that the twisting torque required to rotate the control lever about its longitudinal axis or the force needed to produce the fore and aft pivoting of the lever about its transverse axis, is directly proportional to the pump pressure and the pump speed. It is felt that the pump or motor speed has a lesser affect on the twisting or pivoting torque than the pump or motor pressure.

Power assist means are provided to facilitate the manipulation of the control lever 40 and this means includes a pair of slave rams 45 each including a cylinder 46 which is pivotally mounted on the pump housing or other suitable affixed structure by means of a bracket 47. Each slave ram has a piston movable therein to which is connected a piston rod 48. Each piston rod is pivotally connected to the actuating member 33 by means of a pivot 49. Each slave ram 45 is a single-acting type and one slave ram is connected by means of a conduit 50 to the conduit or passage 32. The other slave ram is connected by means of a conduit 51 to the conduit or passage 31. With this arrangement, it will be seen that during normal operation, an operator will shift the control lever 40 to produce shifting movement of the actuating member. Since each of the single-acting slave rams are connected to the actuating member, one of the slave rams will assist shifting movement of the actuating member when the control lever is shifted in any direction.

For example, if it is assumed that the central lever 40 is in the neutral position, but is then shifted forwardly to produce forward movement of the vehicle, the actuating member 33 for each hydrostatic pump will be shifted so that the pump 24 will be operated to pump fluid through the conduit 31 to the motor 27. The output shaft of the motor 27 will be rotated in a forward direction and the fluid will be returned through the conduit 32 to the pump 24. Since the hydraulic fluid in conduit 31 is under pressure, fluid will immediately flow through the conduit 51 to cause extension of that slave ram to which the conduit 51 is connected. Therefore, immediately upon shifting movement of the control lever 40, power assist will be provided by one of the slave rams 45.

The particular amount of power provided may be selectively varied so as to impart a feel of resistance to the operator. Thus, it may be desirable to select a slave ram of predetermined size so that a predetermined amount of actuating force would be needed to shift the control lever when subjected to a predetermined load. The slave ram piston area and leverage could be calibrated to produce enough force to be slightly less than the required actuation force or alternatively, equal to the actuating force. Therefore, the present power assist device can be calibrated to provide any desired quantum of force for shifting the actuating member.

It is pointed out that while the slave rams have been illustrated diagrammatically as being separate from the hydrostatic pumps, the slave rams could be incorporated internally in the pump housing as a part thereof.

The present power assist device is not only inexpensive, but the single-acting slave rams, simple in operation, are of compact construction. Thus it will be seen that I have provided a novel power assist device for hydrostatic drive systems which is not only of simple and inexpensive construction, but one which functions in a more efficient manner than any heretofore known comparable device.

What is claimed is:

1. In a hydrostatic drive device comprising:
a reversible rotary hydrostatic pump having a revolvable input shaft,
power means,
drive connections connecting the power means with said input shaft of the hydrostatic pump,
a rotary reversible hydrostatic motor having a revolvable output shaft,
means defining a pair of passages each being connected in communicating relation with the pump and the motor to permit hydraulic fluid to be circulated under pressure between the pump and the motor, the output shaft of the motor being revolved in a forward direction when the fluid is pumped from the pump through one passage to the motor and returned to the pump through the other passage, the output shaft of the motor being revolved in a reverse direction when a fluid is pumped from the pump through the other passage to the motor and returned to the pump through said one passage,
a manually operable shiftable elongate control lever being shiftable between forward, reverse and neutral positions,
an actuating member connected with said pump and being shiftable between forward, reverse and neutral positions, said actuating member when in the forward position causing said output shaft of the motor to be driven in the forward direction, and when in the reverse position, causing said output shaft to be driven in a reverse direction, said actuating member when in the neutral position rendering said motor inoperative, an elongate motion transmitting link having one end thereof connected to said control lever and having the other end thereof connected with said actuating member, a pair of hydraulic extensible and retractable ram devices mounted adjacent said pump and each being connected to said actuating member, each ram including a cylinder and piston and being connected in a communicating relation with one of said passages, each of said rams being extended in response to the flow of fluid under pressure from the pump through the associated passage to thereby assist shifting movement of said control lever.

2. The hydrostatic drive device as defined in claim 1 and pivot means pivotally mounting said actuating member for pivotal movement between forward, reverse and neutral positions.

3. A front end loader vehicle comprising a body, front and rear pairs of ground engaging wheels on said body, each wheel having a shaft, an engine having an output shaft, a hydrostatic drive device including:

a reversible rotary hydrostatic pump having a revolvable input shaft, drive means connecting the output of the engine with said input shaft of the hydrostatic pump, a rotary reversible hydrostatic motor having a revolvable output shaft, drive connections interconnecting the output shaft of the hydrostatic motor with the shafts of a pair of ground engaging wheels on one side of the vehicle, means defining a pair of passages each being connected in communicating relation with the pump and the motor to permit hydraulic fluid to be circulated under pressure between the pump and the motor, the output shaft of the motor being revolved in a forward direction when the fluid is pumped from the pump through one passage to the motor and returned to the pump through the other passage, the output shaft of the motor being revolved in a reverse direction when a fluid is pumped from the pump through the other passage to the motor and returned to the pump through said one passage, a manually operable shiftable elongate control lever being shiftable between forward, reverse and neutral positions, an actuating member connected with said pump and being shiftable between forward, reverse and neutral positions, said actuating member when in the forward position causing said output shaft of the motor to be driven in the forward direction, and when in the reverse position causing said output shaft to be driven in a reverse direction, said actuating member when in the neutral position rendering said motor inoperative, an elongate motion transmitting link having one end thereof connected to said control lever and having the other end thereof connected with said actuating member, a pair of hydraulic extensible and retractable ram devices mounted adjacent said pump and each being connected to said actuating member, each ram including a cylinder and piston and being connected in a communicating relation with one of said passages, each of said rams being extended in response to the flow of fluid under pressure from the pump through the associated passage to thereby assist shifting movement of said control lever.

* * * * *